March 25, 1930.  B. B. PERKINS  1,751,493
HARROW TEETH
Filed March 2, 1928
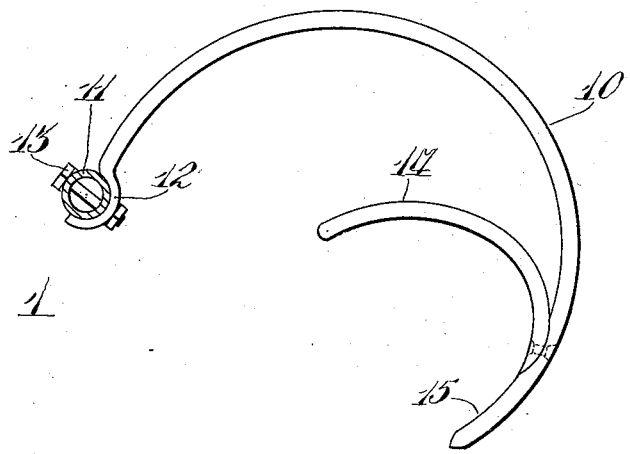
Fig. 1.
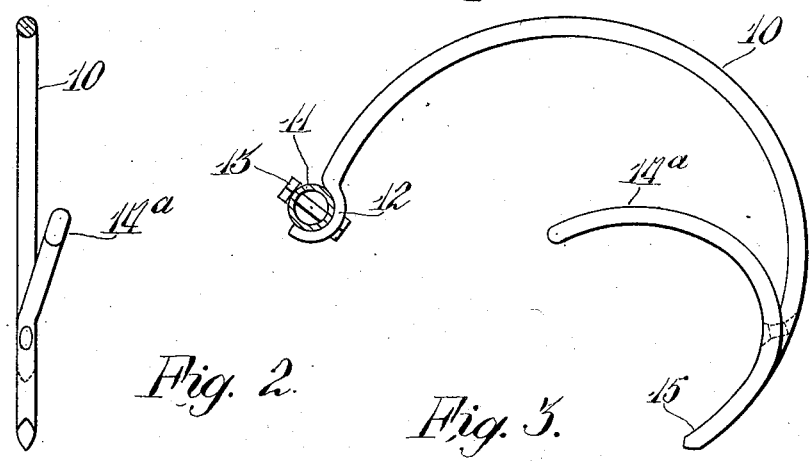
Fig. 2.   Fig. 3.
Fig. 4.
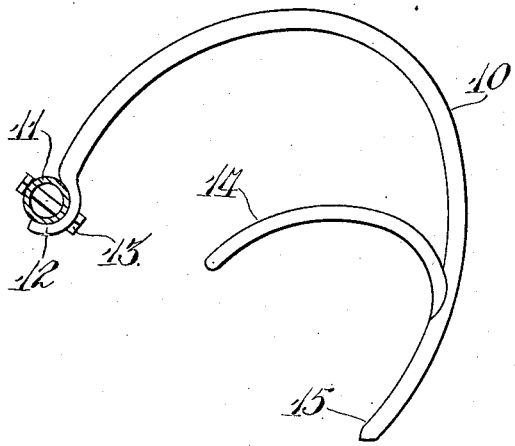
Inventor
Bert B. Perkins
By N. P. Doolittle
Atty.

Patented Mar. 25, 1930

1,751,493

UNITED STATES PATENT OFFICE

BERT B. PERKINS, OF MONTICELLO, MINNESOTA

HARROW TEETH

Application filed March 2, 1928. Serial No. 258,499.

My invention relates to agricultural implements and more particularly to improvement of toothed implements such as harrows and weeders.

The objects of the invention are to improve the construction of harrow teeth and the like so that these will be self-clearing and to overcome the tendency for trash and weeds to accumulate on the teeth. In its more specific aspect, my invention is directed to a spring tooth of novel structure particularly designed for work in quack grass and having means for deflecting or throwing off the grass, etc., uprooted by the tooth. A preferred embodiment of the invention is hereinafter more particularly described and is illustrated in the accompanying drawing where—

Figure 1 is a side elevation of a tooth constructed according to the invention;

Figure 2 is a front or edge view of the lower end of the tooth shown in Figure 1;

Figure 3 is a side elevation showing a modified tooth end structure; and

Figure 4 is a side elevation of a tooth, showing another modified form.

The invention is illustrated as embodied in a harrow tooth comprising a resilient rod, or bar, 10 which is curved or bent into an arcuate or C-shape. The upper or forward end of the bar is secured to a support 11 in any desired manner, that shown consisting in a flattened curved portion 12 on the tooth bar formed to fit on the support 11, the support and tooth bar being clamped together as by a bolt 13.

The main portion or body of the tooth may be regarded as of conventional form, but in the practice of my invention the tooth is provided at a point above its ground engaging end with a forwardly and laterally extending deflecting arm 14. This arm is preferably curved, as illustrated, and has its free end located within the zone enclosed by the arc of the tooth bar and preferably approximately on the axis of the arc of curvature of the tooth. The deflecting arm may be riveted or welded to the bar 10, as shown in Figures 1, 2, and 4, or the point or end of the tooth may be formed as part of the deflecting arm (Figure 3). In this case the ground engaging point and deflecting arm, designated 15 and 14ª in Figure 3, are made integral and the bar 10 is riveted or otherwise secured to the point, as shown in that figure.

In the modified form of Figure 4, the curve of bar 10 is more in the nature of a parabola, and the ground engaging portion of the tooth bar is comparatively straight.

In operation, a tooth constructed according to the foregoing disclosure will uproot the grass or weeds which will accumulate and work up on the tooth bar until the deflecting arm 14 is encountered. This arm then acts to throw or deflect the trash towards one side of the tooth and, due to the sharp angle of separation between the arm and tooth bar, will prevent winding or packing of the trash around the tooth.

It is accordingly clear that a self-clearing tooth of novel and efficient type has been provided and that the deflecting arm structure disclosed is not necessarily limited to spring teeth of the kind herein illustrated and can itself be modified in form within the scope of the invention as defined in the following claims.

What I claim as new is:

1. A harrow tooth formed with a deflecting arm extending forwardly and laterally therefrom at a point above the ground engaging end thereof.

2. A harrow tooth comprising a resilient metal bar bent into arcuate form and a deflecting arm extending laterally from the tooth at a point near to and spaced above the ground engaging end thereof, said arm having its free end located within the arc of the bar and in laterally offset relation to the bar.

3. A harrow tooth comprising a resilient metal bar bent into arcuate form and a deflecting arm extending forwardly from the tooth at a point above the ground engaging end thereof and terminating within the arc of the bar, said arm having its free end deflected laterally beyond the plane in which the bar lies.

4. A harrow tooth comprising a resilient metal bar bent into arcuate form and provided with a curved deflecting arm extending forwardly and laterally from the tooth at a point above the ground engaging end thereof, the free end of said arm being located substantially on the axis of curvature of the tooth and at one side of the plane in which the bar lies.

In testimony whereof I affix my signature.

BERT B. PERKINS.